US008695044B1

(12) United States Patent
Islam et al.

(10) Patent No.: US 8,695,044 B1
(45) Date of Patent: **\*Apr. 8, 2014**

(54) WIRELESS MULTIMEDIA CONTENT BROKERAGE SERVICE FOR REAL TIME SELECTIVE CONTENT PROVISIONING

(75) Inventors: Farhad Fuad Islam, Cary, NC (US); Christopher Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,172

(22) Filed: Aug. 31, 2012

Related U.S. Application Data (63) Continuation of application No. 11/924,210, filed on Oct. 25, 2007, now Pat. No. 8,261,307.

(51) Int. Cl.
*H04N 5/445* (2011.01)
*H04N 7/16* (2011.01)
*H04N 7/173* (2011.01)

(52) U.S. Cl.
USPC ............... 725/62; 725/40; 725/43; 725/106; 455/556.1

(58) Field of Classification Search
USPC .................. 725/40, 43, 62, 106; 455/556.1
See application file for complete search history.

(56) References Cited

U.S. PATENT DOCUMENTS

| | | | |
|---|---|---|---|
| 5,736,982 A | 4/1998 | Suzuki et al. |
| 5,794,210 A | 8/1998 | Goldhaber et al. |
| 5,923,330 A | 7/1999 | Tarlton et al. |
| 5,974,398 A | 10/1999 | Hanson et al. |
| 6,256,043 B1 | 7/2001 | Aho et al. |
| 6,310,859 B1 | 10/2001 | Morita et al. |
| 6,349,301 B1 | 2/2002 | Mitchell et al. |
| 6,396,509 B1 | 5/2002 | Cheng |
| 6,453,294 B1 | 9/2002 | Dutta et al. |
| 6,507,727 B1 | 1/2003 | Henrick |

(Continued)

FOREIGN PATENT DOCUMENTS

| | | |
|---|---|---|
| EP | 1292081 A2 | 3/2003 |
| EP | 1473650 A1 | 11/2004 |

(Continued)

OTHER PUBLICATIONS

Author Unknown, "Yahoo! Avatars", Yahoo! Messenger, Updated 2007, Retrieved May 17, 2007, 2 pages, http://messenger.yahoo.com/avatars.php.

(Continued)

*Primary Examiner* — Kieu Oanh T Bui
(74) *Attorney, Agent, or Firm* — Withrow & Terranova, PLLC (57) ABSTRACT

A wireless multimedia content brokerage service can provide for real time selective content extraction in a manner that allows users to easily obtain, at a mobile device, one or more portions of a real time multimedia composite content presentation. The brokerage service ensures that the experience is transparent from the point of view of the user, and additionally does not require any specific interaction between the user and the display, or interaction between the user and the content service provider (or providers). Instead, the brokerage service handles the transactional details involved in subscribing to content and in obtaining, formatting, and forwarding content to the mobile device. Additionally, since the content of interest is not forwarded from the display itself and since some embodiments of the system do not rely on any interactivity at the display to identify the display device or content, relatively unsophisticated display devices can be used.

20 Claims, 6 Drawing Sheets

(56) References Cited

U.S. PATENT DOCUMENTS

| | | | |
|---|---|---|---|
| 6,545,682 | B1 | 4/2003 | Ventrella et al. |
| 6,556,217 | B1 | 4/2003 | Mäkipää et al. |
| 6,580,811 | B2 | 6/2003 | Maurer et al. |
| 6,629,136 | B1 | 9/2003 | Naidoo |
| 6,672,961 | B1 | 1/2004 | Uzun |
| 6,772,195 | B1 | 8/2004 | Hatlelid et al. |
| 6,795,972 | B2 | 9/2004 | Rovira |
| 6,854,012 | B1 | 2/2005 | Taylor |
| 6,910,186 | B2 | 6/2005 | Kim |
| 6,948,131 | B1 | 9/2005 | Neven et al. |
| 7,006,098 | B2 | 2/2006 | Bickmore et al. |
| 7,034,678 | B2 | 4/2006 | Burkley et al. |
| 7,036,082 | B1 | 4/2006 | Dalrymple et al. |
| 7,073,129 | B1 | 7/2006 | Robarts et al. |
| 7,107,549 | B2 | 9/2006 | Deaton et al. |
| 7,197,126 | B2 | 3/2007 | Kanada |
| 7,216,002 | B1 | 5/2007 | Anderson |
| 7,248,677 | B2 | 7/2007 | Randall et al. |
| 7,386,799 | B1 | 6/2008 | Clanton et al. |
| 7,396,281 | B2 | 7/2008 | Mendelsohn et al. |
| 7,483,958 | B1 | 1/2009 | Elabbady et al. |
| 7,496,647 | B2 | 2/2009 | Karaoguz et al. |
| 7,599,983 | B2 | 10/2009 | Harper et al. |
| 7,614,016 | B2 | 11/2009 | Wong et al. |
| 7,627,536 | B2 | 12/2009 | Kacmarcik |
| 7,840,903 | B1 | 11/2010 | Amidon et al. |
| 7,849,420 | B1 | 12/2010 | Amidon et al. |
| 8,261,307 | B1 * | 9/2012 | Islam et al. ............ 725/62 |
| 2001/0021920 | A1 | 9/2001 | Ikeda |
| 2002/0033848 | A1 | 3/2002 | Sciammarella et al. |
| 2002/0072922 | A1 | 6/2002 | Suzuki et al. |
| 2002/0085031 | A1 | 7/2002 | Conrado et al. |
| 2002/0113820 | A1 | 8/2002 | Robinson et al. |
| 2002/0151327 | A1 | 10/2002 | Levitt |
| 2002/0156875 | A1 | 10/2002 | Pabla |
| 2002/0171647 | A1 | 11/2002 | Sterchi et al. |
| 2003/0005439 | A1 | 1/2003 | Rovira |
| 2003/0028451 | A1 | 2/2003 | Ananian |
| 2003/0051255 | A1 | 3/2003 | Bulman et al. |
| 2003/0060157 | A1 | 3/2003 | Henrick |
| 2003/0063072 | A1 | 4/2003 | Brandenberg et al. |
| 2003/0079177 | A1 | 4/2003 | Brintzenhofe et al. |
| 2003/0101450 | A1 | 5/2003 | Davidsson et al. |
| 2003/0154212 | A1 | 8/2003 | Schirmer et al. |
| 2003/0174178 | A1 | 9/2003 | Hodges |
| 2003/0187984 | A1 | 10/2003 | Banavar et al. |
| 2003/0204846 | A1 | 10/2003 | Breen et al. |
| 2004/0015562 | A1 | 1/2004 | Harper et al. |
| 2004/0073924 | A1 | 4/2004 | Pendakur |
| 2004/0078432 | A1 | 4/2004 | Manber et al. |
| 2004/0125136 | A1 | 7/2004 | Wallenius |
| 2004/0128324 | A1 | 7/2004 | Sheynman et al. |
| 2004/0135820 | A1 | 7/2004 | Deaton et al. |
| 2004/0179037 | A1 | 9/2004 | Blattner et al. |
| 2004/0179039 | A1 | 9/2004 | Blattner et al. |
| 2004/0189701 | A1 | 9/2004 | Badt, Jr. |
| 2004/0193673 | A1 | 9/2004 | Samji et al. |
| 2004/0199867 | A1 | 10/2004 | Brandenborg |
| 2004/0239681 | A1 | 12/2004 | Robotham et al. |
| 2004/0240652 | A1 | 12/2004 | Kanada |
| 2005/0010637 | A1 | 1/2005 | Dempski et al. |
| 2005/0015725 | A1 | 1/2005 | Matsuda |
| 2005/0049886 | A1 | 3/2005 | Grannan et al. |
| 2005/0050079 | A1 | 3/2005 | Plastina et al. |
| 2005/0060746 | A1 | 3/2005 | Kim |
| 2005/0132420 | A1 | 6/2005 | Howard et al. |
| 2005/0137015 | A1 | 6/2005 | Rogers et al. |
| 2005/0190901 | A1 | 9/2005 | Oborn et al. |
| 2005/0198353 | A1 | 9/2005 | Zmrzli |
| 2005/0210387 | A1 | 9/2005 | Alagappan et al. |
| 2005/0264647 | A1 | 12/2005 | Rzeszewski et al. |
| 2005/0266835 | A1 | 12/2005 | Agrawal et al. |
| 2006/0004799 | A1 | 1/2006 | Wallender |
| 2006/0020973 | A1 | 1/2006 | Hannum et al. |
| 2006/0053194 | A1 | 3/2006 | Schneider et al. |
| 2006/0059509 | A1 | 3/2006 | Huang et al. |
| 2006/0064645 | A1 | 3/2006 | Neven et al. |
| 2006/0111188 | A1 | 5/2006 | Winkler |
| 2006/0116987 | A1 | 6/2006 | Bernard |
| 2006/0133407 | A1 | 6/2006 | Kuisma |
| 2006/0148512 | A1 | 7/2006 | Ekholm et al. |
| 2006/0148528 | A1 | 7/2006 | Jung et al. |
| 2006/0161635 | A1 | 7/2006 | Lamkin et al. |
| 2006/0184579 | A1 | 8/2006 | Mills et al. |
| 2006/0195515 | A1 | 8/2006 | Beaupre et al. |
| 2006/0217201 | A1 | 9/2006 | Berstis et al. |
| 2006/0235790 | A1 | 10/2006 | Jung et al. |
| 2006/0242234 | A1 | 10/2006 | Counts et al. |
| 2006/0242581 | A1 | 10/2006 | Manion et al. |
| 2006/0259359 | A1 | 11/2006 | Gogel |
| 2006/0271997 | A1 | 11/2006 | Jacoby et al. |
| 2006/0277474 | A1 | 12/2006 | Robarts et al. |
| 2006/0282391 | A1 | 12/2006 | Peterka et al. |
| 2007/0010195 | A1 | 1/2007 | Brown et al. |
| 2007/0011273 | A1 | 1/2007 | Greenstein et al. |
| 2007/0011617 | A1 | 1/2007 | Akagawa et al. |
| 2007/0013701 | A1 | 1/2007 | Segawa et al. |
| 2007/0082738 | A1 | 4/2007 | Fickie et al. |
| 2007/0094691 | A1 | 4/2007 | Gazdzinski |
| 2007/0099560 | A1 | 5/2007 | Bowen et al. |
| 2007/0113181 | A1 | 5/2007 | Blattner et al. |
| 2007/0127889 | A1 | 6/2007 | Seo |
| 2007/0156726 | A1 | 7/2007 | Levy |
| 2007/0162863 | A1 | 7/2007 | Buhrke et al. |
| 2007/0184855 | A1 | 8/2007 | Klassen et al. |
| 2007/0188502 | A1 | 8/2007 | Bishop |
| 2007/0198364 | A1 | 8/2007 | Quoc et al. |
| 2007/0204287 | A1 | 8/2007 | Conradt et al. |
| 2007/0207860 | A1 | 9/2007 | Yamauchi et al. |
| 2007/0223675 | A1 | 9/2007 | Surin et al. |
| 2007/0287498 | A1 | 12/2007 | Wang et al. |
| 2007/0288470 | A1 | 12/2007 | Kauniskangas et al. |
| 2007/0299737 | A1 | 12/2007 | Plastina et al. |
| 2008/0009268 | A1 | 1/2008 | Ramer et al. |
| 2008/0052242 | A1 | 2/2008 | Merritt et al. |
| 2008/0059422 | A1 | 3/2008 | Tenni et al. |
| 2008/0091521 | A1 | 4/2008 | Ho et al. |
| 2008/0103789 | A1 | 5/2008 | Paila et al. |
| 2008/0104114 | A1 | 5/2008 | Kasperkiewicz et al. |
| 2008/0201638 | A1 | 8/2008 | Nair |
| 2008/0221892 | A1 | 9/2008 | Nathan et al. |
| 2008/0222295 | A1 | 9/2008 | Robinson et al. |
| 2008/0257134 | A1 | 10/2008 | Oppenheimer |
| 2008/0297515 | A1 | 12/2008 | Bliss |
| 2008/0300898 | A1 | 12/2008 | Bacha et al. |
| 2009/0031006 | A1 | 1/2009 | Johnson |
| 2009/0037822 | A1 | 2/2009 | Kandekar et al. |
| 2010/0131584 | A1 | 5/2010 | Johnson |

FOREIGN PATENT DOCUMENTS

| | | |
|---|---|---|
| EP | 1689143 A1 | 8/2006 |
| WO | 2004036902 A1 | 4/2004 |
| WO | 2004080098 A1 | 9/2004 |
| WO | 2005020129 A2 | 3/2005 |
| WO | 2006036207 A1 | 4/2006 |
| WO | 2006115911 A2 | 11/2006 |
| WO | 2012221831 A2 | 3/2012 |

OTHER PUBLICATIONS

Author Unknown, "Cyworld—Main Index", Cyworld, Updated 2007, Retrieved May 17, 2007, 4 pages, http://us.cyworld.com/main/index.php.

Author Unknown, "FAQ", Download MyStrands, Retrieved Oct. 10, 2007, 6 pages, http://www.mystrands.com/mystrands/whatis/faq.vm.

Author Unknown, "Gravatar—Globally Recognized Avatars", Gravatar, Retrieved May 17, 2007, 1 page, http://site.gravatar.com/.

Krol, Carol, "RSS Ad Programs Feed Needs" B to B, Jul. 11, 2005, vol. 90, Issue 9, 4 pages.

(56) References Cited

OTHER PUBLICATIONS

Author Unknown, "Welcome to Luskwood Creatures", Luskwood Creatures, Updated 2006, Retrieved May 17, 2007, 8 pages, http://www.luskwood.com/index.htm.

Cashmore, Pete, "Meez—Avatars for MySpace, Xanga and IM", Mashable! The Social Networking Blog, Aug. 22, 2006, Retrieved May 17, 2007, 17 pages, http://mashable.com/2006/08/22/meez-avatars-for-myspace-xanga-and-im/.

Author Unknown, "MySpace-Homepage", MySpace, Updated 2007, Retrieved May 31, 2007, 2 pages, http://www.myspace.com.

Author Unknown, "Pandora Radio—Listen to Free Internet Radio, Find New Music", Pandora Radio, Updated 2007, Retrieved May 31, 2007, 1 page, http://www.pandora.com.

Author Unknown, "Personalise Skype—Invent Yourself", Skype Klonies, Retrieved May 17, 2007, 1 page, http://skype.klonies.com/studio.php.

Author Unknown, "Press Releases", Comverse, Updated May 17, 2007, Retrieved May 17, 2007, 3 pages, http://www.comverse.com/press_releases.aspx?newsId=412.

El Kaliouby, Rana et al., "FAIM: Integrating Automated Facial Affect Analysis in Instant Messaging," Proceedings of ACM International Conference on Intelligent User Interfaces (IUI), 2004, 3 pages.

Author Unknown, "Rhapsody—Free Access to Millions of Songs Online", Updated 2007, Retrieved May 31, 2007, 3 pages, http://www.rhapsody.com/home.html.

Smith Steve, "Tapping the Feed: In Search of an RSS Money Trail" Econtent, Mar. 2005, vol. 28., Issue 7 pages.

Author Unknown, "Youniversal Branding Part 1—Introduction", Youniversal Branding, Updated Jul. 2006, Retrieved May 17, 2007, 31 pages, http://www.trendwatching.com/trends/YOUNIVERSALBRANDING.htm.

Non-Final Office Action for U.S. Appl. No. 11/924,210, mailed Aug. 20, 2010, 8 pages.

Final Office Action for U.S. Appl. No. 11/924,210, mailed Dec. 6, 2010, 9 pages.

Advisory Action for U.S. Appl. No. 11/924,210, mailed Feb. 6, 2011, 3 pages.

Non-Final Office Action for U.S. Appl. No. 11/924,210, mailed Jun. 16, 2011, 10 pages.

Notice of Allowance for U.S. Appl. No. 11/924,210, mailed Nov. 21, 2011, 8 pages.

Notice of Allowance for U.S. Appl. No. 11/924,210, mailed May 15, 2012, 9 pages.

Robinson, Jack et al., "Using Internet Content as the Means to Establish Social Netowrks by Linking Internet Users, Searchers, Viewers and/or Listeners of the Same and/or Similar Internet Content to each other via a Platform that Enables Any of the Following in N-Dimensional Environments," U.S. Appl. No. 60/856,404, filed Nov. 2, 2006, 132 pages.

* cited by examiner

WIRELESS MULTIMEDIA CONTENT BROKERAGE SERVICE FOR REAL TIME SELECTIVE CONTENT PROVISIONING

CROSS-REFERENCE TO RELATED APPLICATION

The present application is a continuation of U.S. patent application Ser. No. 11/924,210, filed on Oct. 25, 2007, the disclosure of which is hereby incorporated by reference in its entirety.

BACKGROUND

Hand held personal mobile terminals, such as cellular telephones, are becoming the constant companion of contemporary individuals who may encounter real time multimedia content numerous times a day. For example, a person may encounter multimedia content at an airport or other waiting room, at a cafeteria or restaurant, in a lounge, or such as at a hotel. Some of this publicly-viewable content may comprise real time broadcasts provided via large display devices and/or other display devices. In some instances, public or other display devices viewed by an individual may present composite multimedia presentations. Generally, a composite multimedia presentation can comprise multiple simultaneous streams of content. As an example, a single large display may feature multiple video streams which may or may not include accompanying audio.

An individual viewing content (referred to herein also as a "user") may desire to continue to view real time content, but may have any number of reasons to leave the area in which the display device can be perceived. Accordingly, the user may wish to view some or all of the content on a mobile device. If an entire composite multimedia presentation is simply mirrored on the mobile device, the content of the composite multimedia presentation may be difficult or impossible to fully view due to small screen size and/or low resolution of the mobile device. Furthermore, existing systems, such as video on demand systems, require effort on the part of the mobile user to locate the applicable content provider and, in some instances, to obtain a subscription or to perform other rights management activity before actually viewing the content. Thus, opportunities remain to improve the experience for users of mobile devices, such as by providing for partial content extraction onto a device.

SUMMARY

In accordance with some aspects of the present subject matter, a wireless multimedia content brokerage service can provide for real time selective content extraction in a manner that allows users to easily obtain, at a mobile device, one or more portions of a real time composite multimedia presentation. The brokerage service ensures that the experience is transparent from the point of view of the user, and additionally does not require any specific interaction between the user and the display, or interaction between the user and the content service provider (or providers). Instead, the brokerage service handles the transactional details involved in obtaining subscriptions to content and in obtaining, formatting, and forwarding content to the mobile device. Additionally, since the content of interest is not forwarded from the display itself and since some embodiments of the system do not rely on any interactivity at the display to identify the display device or content, relatively unsophisticated display devices can be used. Furthermore, the user is not limited to proximity to a particular display device since the display device does not need to play a role in the transfer of content data to the mobile device.

A wireless multimedia content brokerage system can comprise at least one computing device (referred to as a "brokerage computing device" for clarity) adapted to access presentation identification data that identifies a realtime composite multimedia content presentation. For example, the composite multimedia content presentation can comprise a plurality of content streams, such as a plurality of real time video content streams and one or more audio feeds. The particular manner in which the streams are provided to and by a display device does not matter. For instance, in some embodiments, a display device may receive a single data stream comprising the plurality of multimedia components. In other embodiments, the display device may receive several streams and combine the streams into a composite presentation at the display device.

The at least one brokerage computing device can be adapted to identify at least one content provider associated with the plurality of streams. For instance, in some embodiments, a single content provider assembles and provides the composite content presentation. However, in other embodiments, a composite content presentation may be assembled from streams provided by multiple content providers. In any event, the content provider(s) can be identified in any suitable way. For instance, a mobile device user may provide a suitable identifier, such as a display SIP or IP address, a content identifier (such as an indication of a channel, content provider, or content title or reference number), or the like via an interface that relays the information to the at least one brokerage computing device. Based on the display device SIP/IP address, content identifier, and/or other relevant information, the at least one brokerage computing device can cross-reference the content provider(s) for the presentation to determine what media stream(s) comprise the underlying components of the composite presentation and where to obtain the streams.

For example, if a composite presentation comprises a ticker, a feed of graphics (e.g. a graphical weather forecast), and a video feed of a newscaster, each such component may be made available by the content provider(s) as an individualized stream. The individualized streams may be made available even if the composite presentation is sent as a single stream (e.g. as a single broadcast or cable channel).

The at least one brokerage computing device can be adapted to access data comprising the plurality of streams made available by the content provider(s) and, in some embodiments, to buffer the accessed data. For example, if the content provider(s) push content, the at least one brokerage computing device can issue one or more suitable push requests and receive and buffer the content. Additionally, the at least one brokerage computing device can provide selection interface data to a users mobile device and access selection data provided by the mobile device, with the selection data identifying at least one of the plurality of streams for extraction to the mobile device. The brokerage computing device(s) can further be adapted to transmit the buffered data comprising the at least one identified stream to the mobile device.

In some embodiments, the brokerage computing device(s) may be adapted to avoid buffering accessed data comprising at least one stream that is not identified in the selection data. For example, if a composite multimedia presentation comprises numerous video streams and a particular user elects to view only one stream, the brokerage service can discontinue buffering the other streams. However, in some embodiments, the brokerage service retains sufficient information for a user to revert back to the selection phase and select other streams. Further, buffering may continue if other users served by the brokerage computing device(s) continue to view the same stream. In some embodiments, the brokerage computing device or devices may not buffer content, but may instead act as a pass-through between the mobile device and the content provider(s).

In some embodiments, the least one brokerage computing device may also be adapted to interface with the at least one content provider and, in response to the selection data provided by the mobile device, transmit data identifying at least one change in the display. For example, the mobile device may provide selection data indicating a particular portion or portions of the composite media stream as selected by the mobile device user. Based on the selection data, the at least one brokerage computing device can send data to the appropriate content provider, and the content provider can highlight or otherwise annotate the selected portion(s) at the large display device. Accordingly, a mobile device user can receive feedback provided through a large (or other) display device in selecting which portion or portions to view at the mobile device. Data defining the annotation(s) or highlight(s) may be included in data comprising the media sent to the large display device, or may comprise data sent as separate commands to the display device or other related components such as, e.g. a set-top box associated with the display device.

It should be noted that, although in accordance with some aspects of the present subject matter a display can appear to be responsive to a user, the present subject matter does not require any sort of specific data transfer with or between the display and the user device. Thus, the present subject matter can be used with displays without requiring specialized functionality to support sending content to mobile devices.

In some embodiments, the selection interface data comprises data defining the layout of a graphical user interface, with the graphical user interface comprising respective portions corresponding to locations of various streams in the composite multimedia presentation. For example, the graphical user interface may be presented at the mobile device based on the selection interface data so that a scaled replica of the large display is presented at the mobile device. A mobile device user may then navigate through the graphical user interface to identify one or more portions of the composite multimedia display. The individual streams may be represented as still images in some embodiments.

In some embodiments, the brokerage computing device can be further adapted to determine whether one or more subscriptions are needed to access the plurality of streams and, if so, obtain the needed subscription or subscriptions. For instance, prior to accessing data comprising the streams, a database or other suitable set of information can be accessed to determine if a subscription is needed to access the stream and whether or not such a subscription is available. For content which is not subscription-based, other actions can be taken to ensure that the computing device has sufficient rights to obtain and provide the content stream(s) to the mobile device. The present subject matter is not limited by the particular type(s) of rights clearance steps required to access content, and can even be used with regard to content that requires no rights management.

In some embodiments, the at least one brokerage computing device can be adapted to interface with at least one content provider after identifying the content provider and obtain at least one structured data file identifying a network address for each of the plurality of content streams comprising the content display. Further, in some embodiments, the structured data file may also comprise data identifying the spatial arrangement of the composite media display. The at least one brokerage computing device may be adapted to generate the selection interface data based on the structured data file. As an example, a content provider may make one or more structured files such as XML files available and cross-referenced to specific display devices by display device SIP/IP address or other identifier(s). The XML files may specify a network address, such as a SIP/IP address and/or other identifier(s), for each component of the composite media display provided at the display device.

In some embodiments, the brokerage computing devices can be adapted to access presentation identification data and identify at least one content provider as part of a partial content service session. The brokerage device(s) may further be adapted to determine the location of the mobile device and, based on the location of the mobile device and the identity of the content provider, determine whether a transfer of the partial content service session to a mirror brokerage device is needed. Accordingly, in some embodiments, the system can comprise multiple brokerage computing devices, at least one of which is configured to selectively act as a mirror device. In handing a particular session, the brokerage device(s) configured as a mirror device can then access selection data, access data comprising the plurality of streams, buffer the data, and transmit the buffered data to the mobile device in response to a transfer of the partial content extraction session from a different brokerage computing device.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. For instance, as noted in further detail below, a communications system may comprise one or more systems that can provide wireless multimedia content brokerage services. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology, such as subscriber databases, may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

Software agents are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) configuring the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. Agent functionality may be handled by a single agent or coordinated amongst multiple agents. Agent(s) may reside in one computing device or may be distributed amongst multiple computing devices. No particular level of autonomy or "intelligence" is required of a software agent; for instance, in some embodiments, the term "software agent" can refer to a routine or a collection of routines that provide particular functionality.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links. Although several examples herein relate to an IMS-complaint network, in other embodiments, the subject matter may be implemented as part of a network (or networks) based on other public or proprietary standards.

Figure 1:
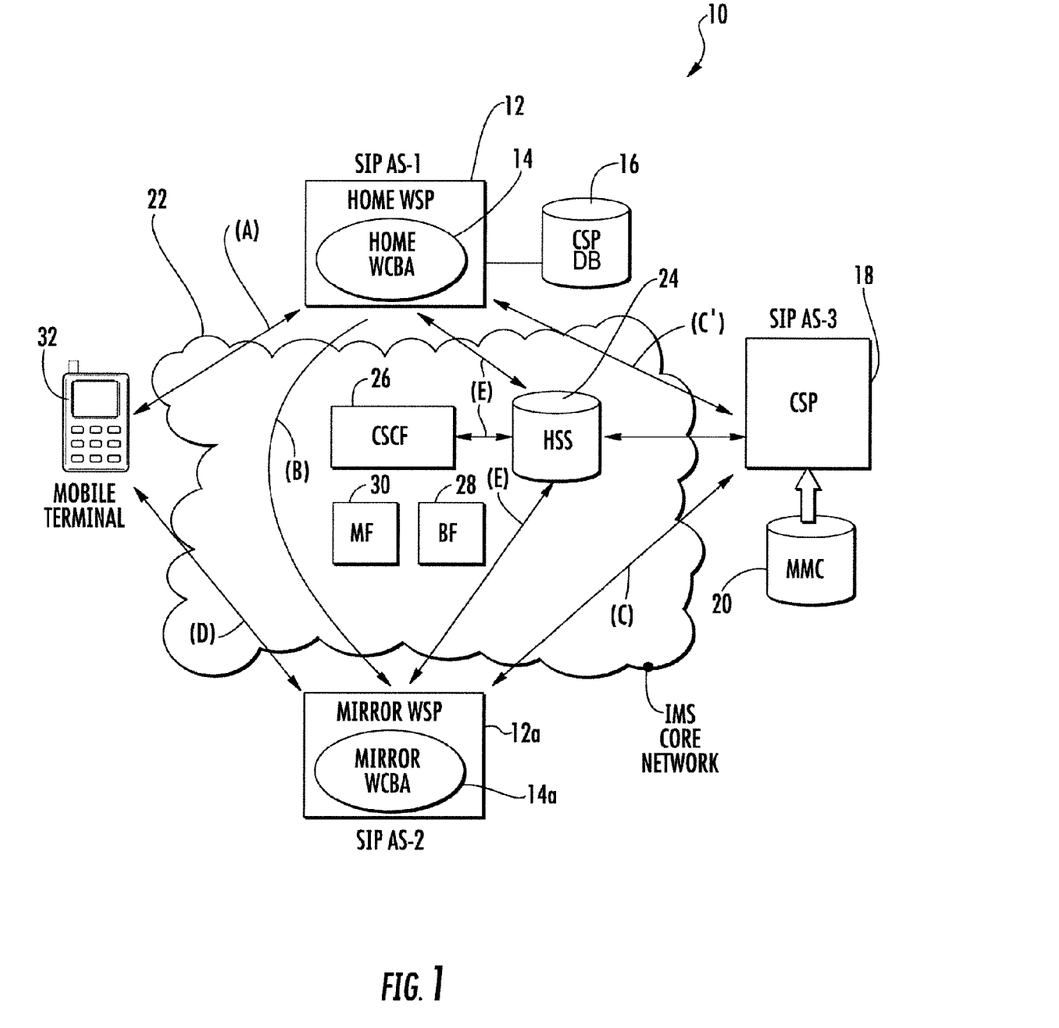
FIG. 1 is a block diagram showing an overview of an exemplary communications system comprising a wireless multimedia content brokerage service that supports partial content extraction to mobile devices.

FIG. 1 is a block diagram showing components in an exemplary communications system 10 that includes a wireless multimedia content brokerage service that includes support for partial/selective extraction of content displays provided via one or more large display devices and forwarding of such content to mobile devices. In this example, the service is provided by way of one or more application servers 12 and 12a, also labeled with exemplary SIP addresses "SIP AS-1" and "SIP AS-2." Each application server comprises one or more computing devices adapted to provide a wireless content brokerage agent (WCBA) 14, 14a. For example, a wireless content brokerage agent may comprise one or more processes, applications, or software agents which receive requests for content extraction, manage incoming and outgoing media streams, and coordinate transactional details, such as subscriptions and other rights management with regard to content. Although not discussed in detail herein, application servers such as 12 and 12a may, in some embodiments, be adapted to provide other services/functionality.

Other aspects of exemplary communications system 10 comprise IMS core network 22, which can comprise any all-IP telecom network that requires each end element to have an IP address expressed in a SIP (Session Initiation Protocol) format. IMS has been standardized by the Third generation Partnership Project (3GPP) and has been accepted by the telecom world as the next generation telecom standard running on IPv6 (Internet Protocol Version 6). Further, media streams can be transferred using SIP/SDP/RTP protocol, which refers to Session Initiation Protocol/Session Description Protocol/Real Time Protocol.

Generally speaking, in some embodiments, application servers, such as servers 12, 12*a*, and server 18 (discussed below) are in the service layer of IMS. Mobile terminals, such as exemplary mobile terminal 32, communicate with other mobile terminals, other devices in the IMS network, and IMS services by way of IMS core network 22.

Although the full details of the IMS network are not explored herein, FIG. 1 further illustrates several elements as generalized block diagrams. Namely, the home subscription server/database (HSS) 24, call session control function (CSCF) 26, border functions (BF) 28, and media functions (MF) 30 are identified for sake of completeness. Briefly, HSS 24 serves as a clearinghouse for data regarding various devices in the IMS network, such as user or device profiles. CSCF 26 provides for call session control functions governing telephone and other communications functionality. Border Functions 28 handle communication between different IMS core networks, while media functions 30 process or manipulate multimedia for optimal transit through the network.

Content service provider 18 comprises any entity which, via one or more computing devices, makes multimedia content available to consumers via the IMS network 22. For instance, multimedia content displays can be provided via one or more large display devices viewable in public or other areas. In other embodiments, content service provider 18 may additionally or alternatively provide content without the use of an IMS network. For instance, the present subject matter can be implemented in a system using broadband data communication standards other than IMS, such as an IP-based distribution system accessible by a wireless service provider. Additionally, multiple network types may be used. For instance, content may be made available to display devices through one type of network, such as a broadcast or cable television network, while identification of displays, communications with mobile devices, and streaming of components occur over another network, such as a cellular telephone network and/or wireless Internet.

Although several examples herein relate to multimedia content presented via a large display device, it is to be understood that the present subject matter is not intended to be limited to particular types of content or particular mode or manner of presentation. For example, other content presentation systems may provide 3-D content (with or without audio). Furthermore, the display need not be large or public. For instance, a user may view a composite content presentation at a friend's home or other private setting at a small screen (e.g. television, computer screen) and extract partial content using embodiments of the present subject matter.

Returning to exemplary application server 12, the wireless content brokerage agent 14 provided via server 12 communicates with one or more mobile users to ascertain each user's media extraction requirements and arranges for multimedia flow from the appropriate content service provider or providers, such as content service provider 18. Namely, wireless content brokerage agents such as 14 can obtain content directly from content service providers, such as 18, and provide the content in a suitable form to mobile terminals, such as terminal 32. Accordingly, no rights management or other transactional details need to be handled directly by the user at mobile 32 for a particular content extraction session. Additionally, no interaction between the user and display device is required. Thus, relatively "dumb" large display devices can be used. In other embodiments the extraction experience can be enhanced through support of some interactivity/data transfer at the large display device, but this is not required.

Additionally, the "home" wireless content brokerage agent (14 in this example) is responsible for maintaining a content service provider database 16 that references major contents service providers known to supply multimedia content to public display devices. Database 16 can be used to determine when a mirror application server should be utilized for best service quality.

For instance, content service providers may service different geographic regions and may even be dispersed across continents. Thus, one or more mirror content brokerage services can be provided so that it is not necessary for content to be routed over excessive distances. Instead, local content from local content service providers can be routed through local mirror wireless service provider application servers. In this example, application server 12*a* and content brokerage agent 14*a* comprise a "mirror" service/agent supporting a different area than server 12 and agent 14. For example, when a user of mobile terminal 32 is far from his home network, such as on another continent, content may be routed through server 12*a* rather than through home server 12.

Generally, the user can associate with a given wireless service provider and obtain a subscription to the partial content extraction service. The partial content extraction service, for example, may be provided by the user's communications carrier (e.g. cell phone company) or may be a separate service provided by one or more third parties. In any event, the wireless service provider affiliates with content providers such as content service provider 18 in order to obtain sufficient rights to retrieve and forward selected content to mobile device 32. For example, the wireless service provider may proactively or on a case-by-case basis obtain subscriptions to content service providers based on the location of mobile device 32. Additionally or alternatively, content brokerage agent 14 may engage in other rights clearance activities other than obtaining subscriptions.

Figure 2:
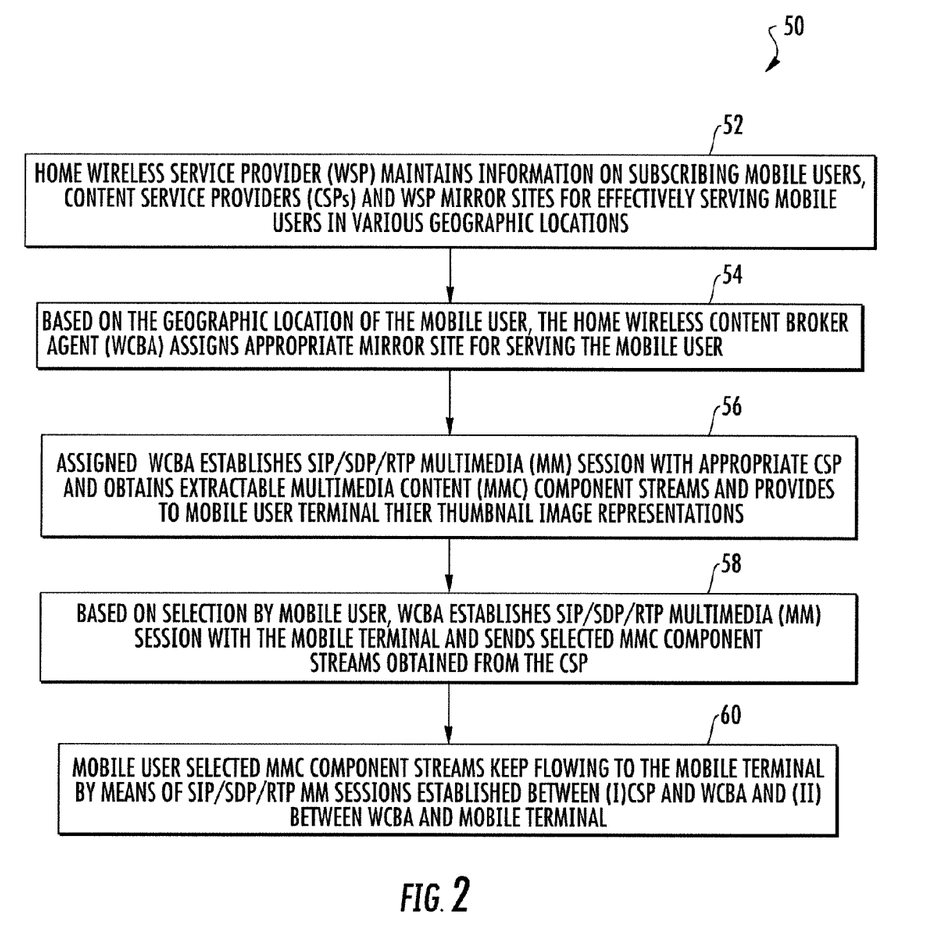
FIG. 2 is a flowchart showing exemplary steps in a high-level process for providing wireless multimedia content brokerage services.

FIG. 2 provides a high-level conceptual overview of some aspects of the present subject matter by illustrating exemplary steps in a process 50 for providing partial content provisioning via a wireless multimedia content brokerage service. Additionally, the exemplary steps of FIG. 2 are cross-referenced by letters to exemplary communications shown in FIG. 1 and identified by capital letters A through E.

At step 52, the home wireless service provider maintains information on subscribing mobile users, content service providers, and wireless service provider mirror servers. For instance, the information can be arranged and/or accessed by algorithms, processes, or applications that are configured to determine the optimal component combinations for serving users based on location. As shown at (A) in FIG. 1, server 12 is in communication with terminal 32 to determine the location of terminal 32. Location may be tracked in any suitable manner, such as by geographic coordinates (e.g., GPS) or network location (e.g. cell ID). Additionally, home wireless content brokerage agent 14 receives a request from the user of terminal 32 identifying a composite multimedia presentation comprising content which the user of terminal 32 wishes to have forwarded/routed to terminal 32.

At 54, based on the geographic (or other) location of the mobile user, the home wireless content brokerage agent 14 assigns an appropriate mirror site to service the mobile user. This is shown at (B) in FIG. 1, which represents one or more data transfers between server 12 and server 12*a* which serve to alert mirror WCBA 14*a* that content extraction is to be handled by wireless content brokerage agent 14*a*. For example, the user of mobile terminal 32 may be physically closer to server 12a rather than home server 12. As another example, such decisions may not depend on the relative location of the mobile terminal relative to the server, but instead may depend on the relative location of the server to the content provider. Of course, other network factors may be considered in addition to or instead of location.

At step 56, the assigned WCBA establishes a suitable connection with a content service provider. For example, data provided by home server 12 may indicate that content from content service provider 18 is to be forwarded to device 32. Accordingly, mirror WCBA 14a may establish a SIP/SDP/RTP multimedia session with content service provider 18 and obtain extractable multimedia content component streams. This is shown at (C) in FIG. 1. Briefly, (C') in FIG. 1 shows the connection that would be made between content service provider 18 and home server 12 if, for example, terminal 32 were to be served via home server 12/home WCBA 14.

As will be discussed in further detail below, the wireless multimedia content brokerage service can interface with mobile terminal 32 to receive selection data from a user. The selection data can identify one or more of a plurality of multimedia streams displayed in a composite multimedia presentation which are of interest to the user. For example, the content brokerage agent 14a can generate a graphical user interface that enables the mobile terminal user to navigate through a representation of a large display to indicate one or more streams of interest. If home agent 14 were handing the entire session, then home agent 14 would generate the graphical user interface.

As shown at 58, based on the selection data provided by the mobile user, the wireless content brokerage agent sends the selected stream or streams to the mobile terminal. In FIG. 1, this is shown at (D). If home server 12/home agent 14 were serving terminal 32, then the content would flow over the same path as (A), although it will be understood that the multimedia flow can be entirely separate from the initial request.

In step 60 shown in FIG. 2, the mobile user selected multimedia content component streams continue to flow to the mobile terminal via one or more SIP/SDP/RTP multimedia sessions established between the content service provider and content brokerage agent, and between the content brokerage agent and the terminal. The streams can continue until any suitable end event, such as termination command by the user of terminal 32, the end of the multimedia content stream, or other considerations.

Figure 3:
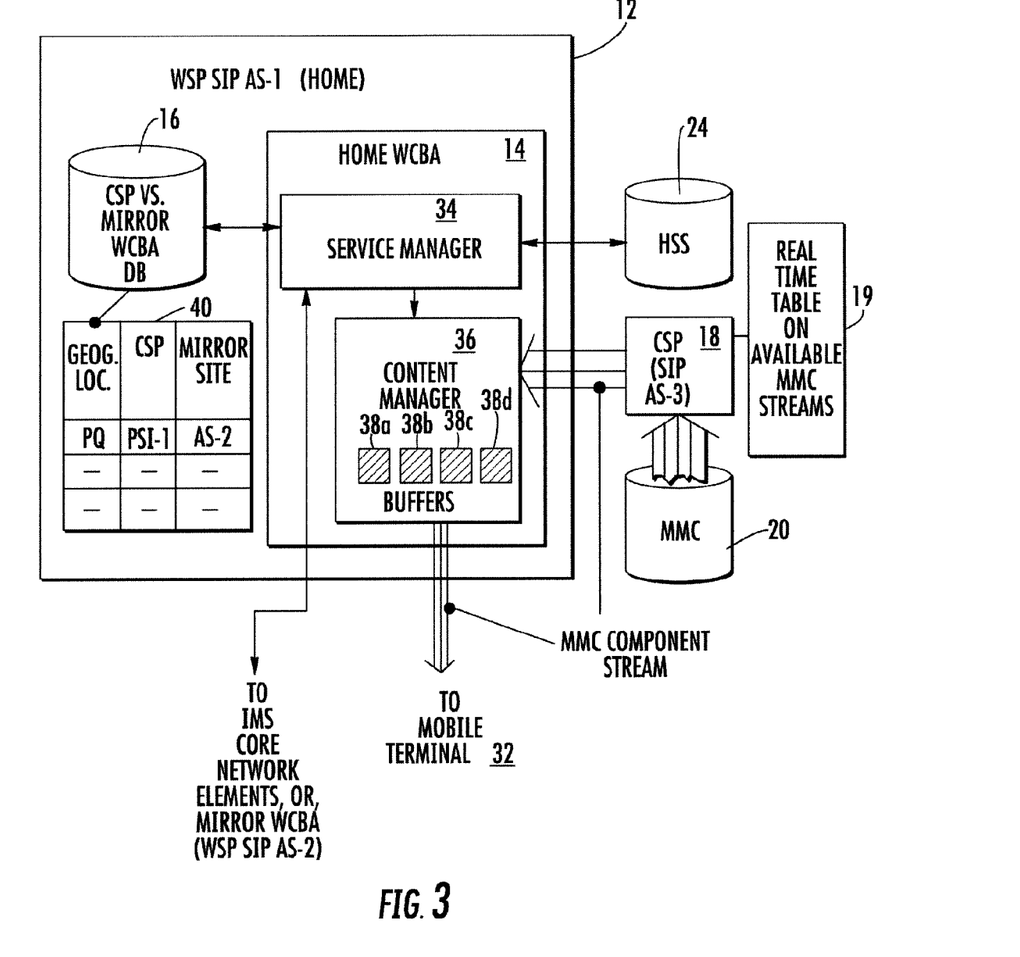
FIG. 3 is a block diagram showing aspects of an exemplary wireless multimedia content brokerage service in closer detail.

FIG. 3 is a block diagram showing a closer view of an exemplary application server 12. Also, in this example, application server 12 further comprises content service provider database 16. Specifically, database 16 comprises table 40 that comprises a listing of content service providers, mirror sites, and other applicable information by geographic location. Table 40, and any other databases or datasets discussed herein, can be provided by any number or type of databases in any suitable logical or physical format.

As was noted earlier, wireless content brokerage agent 14 accesses database 16 in order to determine optimal handling of partial content extraction and forwarding. Also, in this example, content brokerage agent comprises a service manager component 34 which handles initialization of content extraction sessions and a content manager component 36 which handles accessing and buffering content, generating selection interfaces, receiving selection data, and buffering and forwarding content to users. Thus, content manager component 36 may be used to handle sessions initiated by service manager component 34 and to handle incoming sessions where application server 12 and agent 14 act as a mirror for other servers/agents.

For instance, in this example, service manager 34 accesses database 16 and, as needed, handles contacting and interacting with mirror service providers and/or content providers. For instance, by referencing home subscriber service 24, service manager 34 may determine the location of mobile users and thereby make effective use of CSP database 16. In embodiments which do not utilize IMS, another suitable source of information as to the location of mobile users can be used rather than HSS 24.

Several other details illustrated in FIG. 3 relate to when content brokerage server 12 is handling media extraction and forwarding to mobile devices without use of a mirror server. For instance, a content manager 36 may utilize one or more buffers 38a, 38b, 38c, and 38d to buffer incoming content during the interval between a forwarding request and the actual provision of multimedia content to a mobile device. For example, one buffer may be used for each of a plurality of media streams that comprise a composite multimedia presentation of multimedia content. Although four buffers are shown in this example, it will be understood that an application server may have access to more or fewer buffers in order to adequately service a desired number of mobile users. Furthermore, in some embodiments, buffer(s) used for a particular multimedia content stream may be used to provide data for multiple users. The particular portion of content extracted from the buffer may differ between users in such cases. Any suitable type of hardware and/or software-based buffering schemes can be used. Still further, in other embodiments, no buffering is performed, and content manager 36 provides a pass-through functionality (although some buffering may be incidental to the pass-through functionality).

In this example, service manager 34 can access a dynamic table of available content streams 19 to determine particular media stream addresses to access. For example, as will be discussed below, a composite multimedia presentation may comprise media from several different feeds. When a user identifies a particular display, several or all of the streams comprising the composite multimedia presentation can be accessed via their respective network addresses and can be buffered in a respective buffer. The user can then be prompted to select one or more streams of interest. Once the stream(s) of interest are identified, the buffered content can be forwarded to the user.

Figure 4:
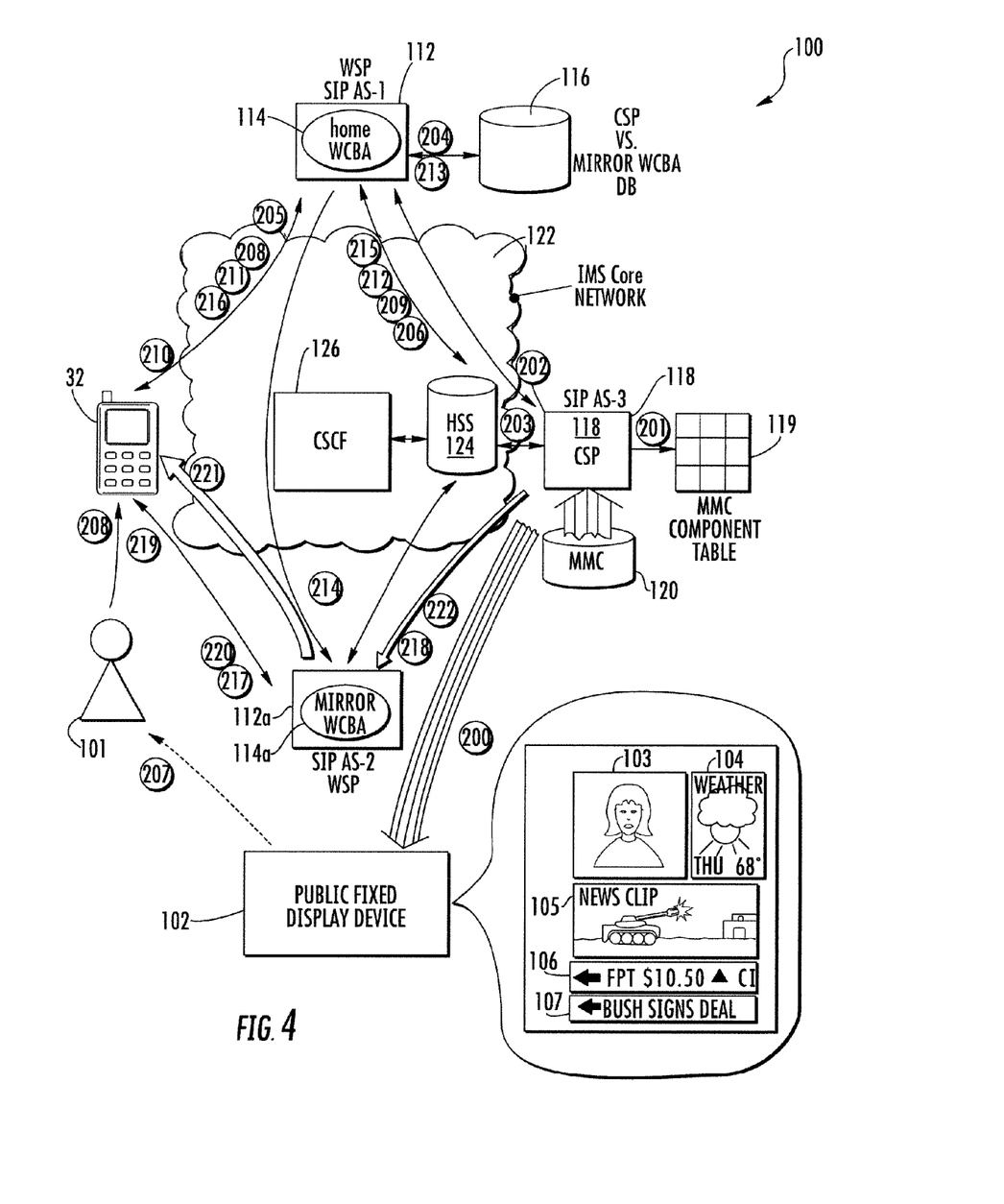
FIG. 4 is a block diagram showing another exemplary communication system comprising a wireless multimedia content brokerage service.

FIG. 4 provides a more detailed view of an exemplary communications system 100 comprising a wireless multimedia content brokerage service with support for partial content extraction. This example also depicts an exemplary user 101 associated with mobile device 132, with user 101 coming within perceptible range of a public fixed display device 102. Although the term "public" is used, the particular conditions required to view display device (or lack of such conditions) can vary. For example, a "public" display can comprise any display that can be viewed by one or more users, and may vary in size. Furthermore, the "display device" can comprise not only the screen, projection, and/or other equipment used to render a perceptible image, but additional components used to receive signals, such as one or more computing devices such as a set-top box (whether a separate component or integrated with other components) and the like. Furthermore, the "display" can include ancillary components not related to visual aspects of the presentation, such as speakers for audio content.

As shown in the inset, public display device 102 provides a composite multimedia presentation of several different multimedia real-time content streams. Namely, in this example, the display comprises a newscaster 103, graphical weather forecast 104, news clip 105, scrolling stock ticker 106, and scrolling news ticker 107. User 101 may wish to view some components on mobile device 132, but it may not be feasible for all components to be displayed on the screen of mobile device 132. For instance, the screen may be too small to show all components, or the bandwidth requirements for viewing all streams may be too excessive. Thus, in accordance with the present subject matter, user 101 can request for partial content extraction of the content displayed at device 102.

The remaining components illustrated in FIG. 4 are generally analogous to components with similar numbers shown in FIGS. 2-3. For instance, home application server 112 comprises home content brokerage agent 114 with access to database 116 in the same manner as home server 12 comprises home content brokerage agent 14 with access to database 16. Accordingly, mirror server 112a, mirror content brokerage agent 114a, home subscriber server (HSS) 124, IMS core network 122, content service provider 118, multimedia content source 120, multimedia content component table 119, and are not discussed in further detail. IMS call support components are generally illustrated at 126 and may comprise, for instance, P-CSCF, I-CSCF, and S-CSCF.

Exemplary operation of a wireless multimedia content brokerage system such as the one shown in network 100 will now be discussed in conjunction with FIGS. 5 and 6, which each illustrate steps in exemplary processes for operating such a service. Additionally, in a later example, reference will be made to communications occurring between components shown in FIG. 4 and labeled 201 through 222.

Figure 5:
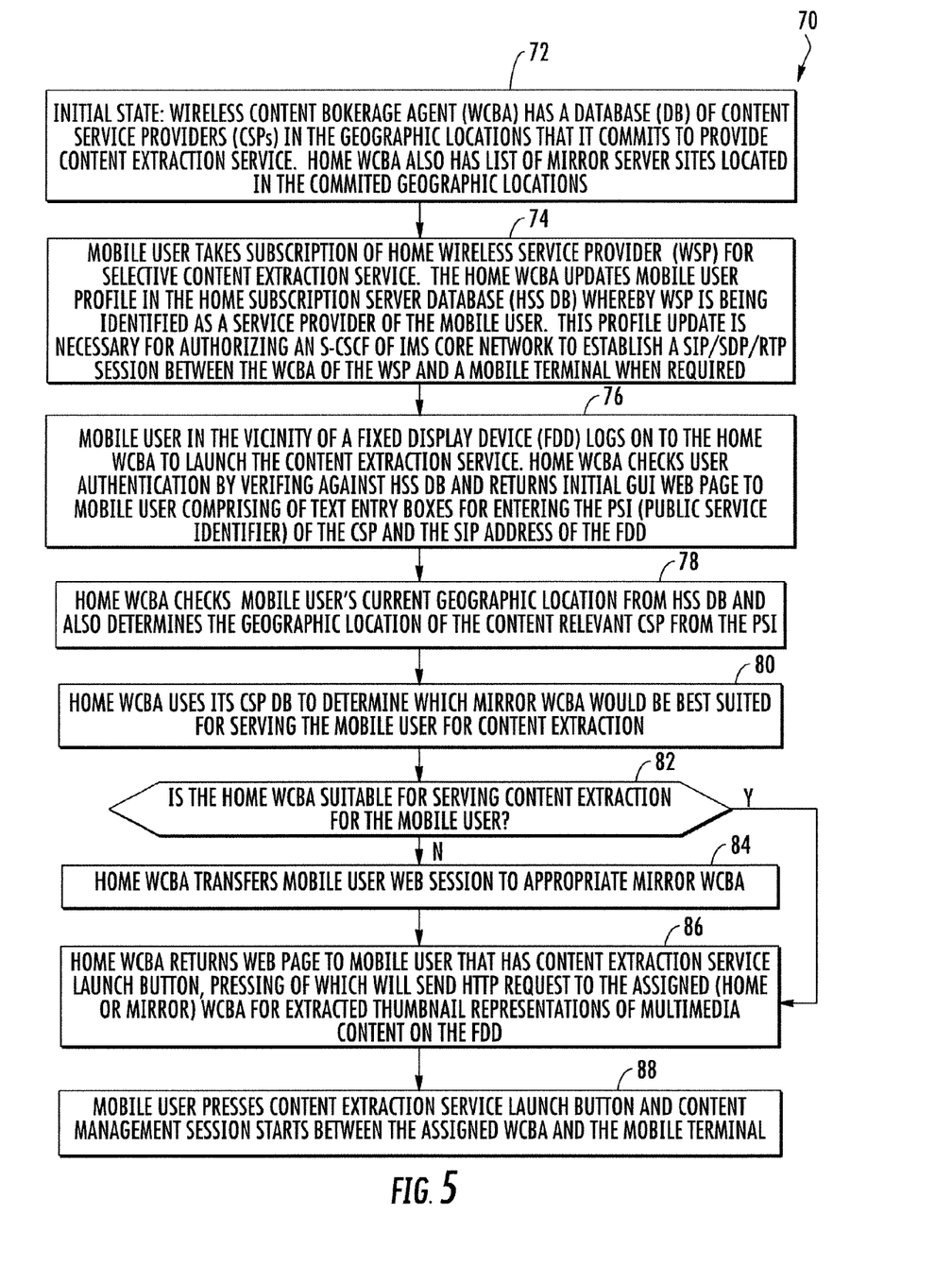
FIG. 5 is a flowchart showing steps in an exemplary process for service management by a brokerage agent, including assigning an appropriate mirror agent when needed.

FIG. 5 shows an exemplary process 70 comprising steps related to service management aspects of a wireless content brokerage agent. Step 72 represents an initial state, where a wireless content brokerage agent has access to a database of content service providers in geographic (or other) locations which the content brokerage agent commits to provide content extraction and forwarding services. Each home content brokerage agent also has access to a list of mirror service sites located in the committed geographic locations. Although several examples herein relate to content brokerage services supporting mirroring, in other embodiments, all requests can be handled by the home agent. Accordingly, mirroring-related functionality could be omitted.

Step 74 represents an initial setup step between a wireless device user and the content brokerage agent, wherein the user obtains a subscription from the wireless service provider for selective content extraction services. As was noted above, this service may be provided as a feature in a calling plan or other arrangement between a wireless service provider and a user, or may be provided as a third party service.

The home content brokerage agent updates the mobile user's profile in the home subscription database identifying the wireless service provider as the mobile user's home provider. In embodiments in which the content brokerage service is implemented as part of an IMS core network, such as network 122, such a profile update is necessary for authorizing an S-CSCF component of the core network to establish a SIP/SDP/RTP session between the content brokerage agent and the mobile terminal.

Step 76 represents service management activities that may be performed at some point after a user has subscribed or otherwise obtained the services of the wireless multimedia content brokerage system. For instance, a user may set up the content forwarding service sometime prior to encountering content, or may be prompted to subscribe to the content forwarding service at the time the user encounters content. At step 76 a mobile user, such as user 101 in FIG. 4, comes into the vicinity of fixed display device 102 and logs onto the user's home content brokerage service by contacting a brokerage agent to launch the content extraction service. For example, the home brokerage agent can verify authentication for the content extraction service by checking the home subscriber database.

At step 78, the home content brokerage agent obtains information regarding the mobile user's current geographic or other location. This information may be obtained, for example, from the home subscriber service database in implementations in a system supporting IMS functionality. Based on identification data provided by the user, the brokerage agent can determine the geographic or other location of the content provider for the display device of interest. As shown at 80, the home content brokerage agent uses its content service provider database 116 to determine which mirror content brokerage agent (if any) would be best suited for servicing the mobile user for the particular content extraction service. As shown at 82, if a home content brokerage agent is suitable for providing the content extraction service, process 70 skips to step 86. However, if the home content brokerage agent determines that another agent would be more appropriate, then as shown at 84, the home agent transfers the mobile user's web session to an appropriate mirror content brokerage agent. For instance, as was noted earlier, a user outside the geographic region served by the home content brokerage agent may be better served by a local brokerage agent with a closer or more robust connection to corresponding local content service providers.

As shown at 86, the home content brokerage agent which is handling the mobile user session returns a web page (or other suitable interface) to the user that can be used to send a request to the appropriate content brokerage agent to launch the content extraction service. The content brokerage agent which receives the request can then provide a suitable representation of the fixed display multimedia content for further selection by the user. As shown at 88, the mobile user provides data indicating a launch, such as pressing a content extraction service launch button, selecting a launch command using an interface on the phone, or in any other suitable manner. At this point, a content management session begins between the assigned content brokerage agent and the mobile terminal. If no mirror agent is used, then the content management session is also handled by the home content brokerage agent.

Figure 6:
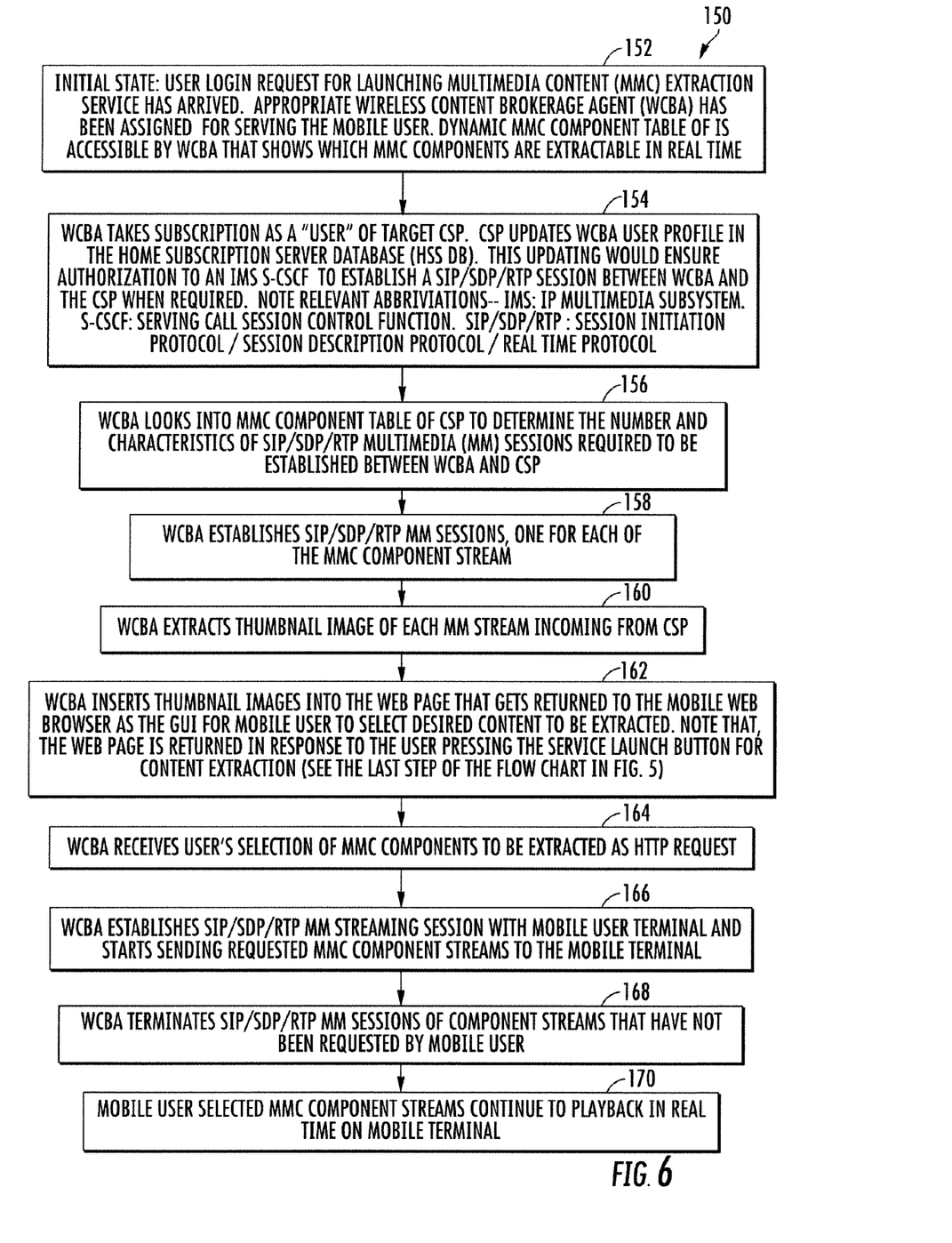
FIG. 6 is a flowchart showing steps in an exemplary process which may be carried out by a wireless multimedia content brokerage service in support of provisioning partial content.

FIG. 6 illustrates steps in an exemplary content management session 150 between a wireless content brokerage agent and a mobile terminal. Step 152 represents an initial state wherein a user request for launching a multimedia content extraction session has arrived at an assigned content brokerage agent. The agent has access to a dynamic multimedia component table showing which multimedia content components of a particular display of interest are extractable in real time. For example, in some instances, a public display device may comprise a composite media display that includes elements which are not extractable. The component table may include a place holder or other indication so that the content brokerage agent can inform the mobile user of which content streams are available.

At 154, the content brokerage agent obtains a subscription as a user of the target content service provider. For instance, the content service provider may also use the home subscription server database of the IMS network to manage authorization for obtaining content. In such embodiments, the content service provider can update a user profile corresponding to the content brokerage agent to ensure authorization to the IMS components when required. At 156, the content brokerage agent accesses the multimedia component table for the identified content service provider to determine the number and characteristics of communication sessions which are needed in order to obtain content comprising the composite multimedia presentation. For example, the content brokerage agent may determine which particular SIP/SDP/RTP sessions are required to access the data comprising the streams of interest. At 158, the content brokerage agent establishes the required connections, such as an SIP/SDP/RTP multimedia session for each component stream of the content display.

At 160, the content brokerage agent extracts a thumbnail image of each multimedia stream incoming from the content service provider. At 162, the thumbnail images are inserted into a web page. This web page can be returned to the mobile device as part of a graphical user interface for the mobile user. For instance, the mobile user can navigate through a replica of the composite multimedia presentation in order to provide selection data to the content brokerage agent. For example, the images may be placed into the webpage that is returned to the user in response to launching the service as noted at step 88 in FIG. 5. Of course, the graphical user interface need not necessarily comprise a web page, and other data formats/protocols could be used to provide the graphical user interface.

At 164, the content brokerage agent receives the user's selection of multimedia components for extraction. At 166, the content brokerage agent establishes an SIP/SDP/RTP multimedia streaming session with the mobile terminal and sends the requested mobile streams to the terminal.

In some embodiments, during the time between initial identification of the display and the time at which the content brokerage agent begins streaming to the mobile device, the content brokerage agent may buffer incoming content streams. In such embodiments, the streaming sessions to the user terminal may begin at the earliest point in the buffer so that the recipient can avoid missing any portions of the content of interest. In other embodiments, the multimedia content may be mirrored at the device in real time or near real time, with or without buffering at the content brokerage agent. For instance, in some embodiments, the brokerage agent acts as a pass-through only (although some incidental 'buffering' may occur during the pass-through operations).

In this example, at 168 the content brokerage agent terminates the SIP/SDP/RTP multimedia sessions of component streams that are not selected by the mobile user. However, depending upon how the system is optimized and otherwise configured, then buffering may not be discontinued. For instance, if an agent is providing the same content to multiple users, the data may be maintained in a shared buffer which is continually updated until no more users are accessing the content. At 170, the selected component streams continue to play back in real time at the mobile terminal. The component streams may continue until the end of the particular multimedia content in the streams and/or another termination event, such as termination of forwarding by the user.

Another example of content and service management steps and data transfers which can occur in a system that includes a content brokerage service will now be discussed in conjunction with FIG. 4. The following example explores additional detail while following a flow path similar to the previous example discussed above. As shown at 200 in FIG. 4, a content service provider, such as content service provider 118, obtains multimedia content 120 which is sent to a public fixed display device 102. Multimedia content 120 may be obtained from any suitable sources, including stored data, live feeds, broadcast sources, and the like.

As shown in the inset of FIG. 4, public fixed display device provides a multimedia display comprising a plurality of multimedia streams. Each one of the streams 103-107 can comprise real time video content with or without accompanying audio. Additionally, as shown in FIG. 4 at 201, the content service provider 118 updates multimedia component table 119 to identify the plurality of multimedia streams associated with display device 102. For example, the data could be in the form of an XML file that would be configured for a content brokerage agent to sort via a style sheet associated with the XML file. The XML file may comprise characteristics identifying each partial content stream in a manner such that content brokerage agents can establish appropriate SIP/SDP/RTP sessions with the content service provider if required. In some embodiments, the XML file may contain the coordinates of the partial content on the display screen so that the content brokerage agent can provide data to mobile users based on the special arrangement of content on the public display.

As shown at 202, the home wireless service provider 112 obtains a subscription to content service provider 118. For example, this subscription may be obtained in response to determining that user 101 is in a geographic or other location served by content service provider 118 on large display devices. If service provider 112 already has an adequate subscription, then no subscription is needed. As shown at 203, the content service provider updates one or more home subscription server database profiles to indicate that the wireless service provider and its brokerage agents (including the home and mirror content brokerage agents 114 and 114A) as authorized user of its multimedia content. As shown at 204, the home content brokerage 114 maintains a table or other suitable data mapping content service providers to suitable mirror content brokerage agents. At 205, mobile user 101 becomes a subscriber of the selective content extraction service provided by the wireless multimedia content brokerage service. Content brokerage agent 114 updates the profile of user 101 in home subscription server database 124.

As shown at 207, user 101 encounters a composite multimedia presentation comprising a plurality of multimedia streams 103-107 provided via a public fixed display device 102. The display may include one or more public service identifiers indicating the source of the content. Additionally, the display itself may include one or more indications of its SIP address or other identifier(s). Although not required for the present subject matter, in some embodiments, the display includes communication functionality, such as Bluetooth or Wi-Fi connectivity for automatically providing its SIP address and/or content identifiers to interested users.

As shown at 208, the mobile user launches a browser or other thin client application on terminal 132 and logs onto home service provider 112 to begin the multimedia content extraction service. The home content brokerage agent 114 authenticates user 101 by referencing subscriber database 124 as shown at 209.

Home content brokerage agent 114 returns a mobile web page or other suitable user interface data through which user 101 can use terminal 132 to identify the content of interest as shown at 210. For example, the user may be provided with a mobile web page for entering a public service identifier of the content service provider and/or the SIP address of the display device. If the display supports local communication, such data may be obtained from the display. However, it is emphasized that the display does not need to have any such data transfer functionality, provided some sort of indication of the display identifier(s) is provided (e.g. a sign or panel). As shown at 211, the data identifying the display device is sent to the home content brokerage agent. In some embodiments, no explicit identification of the display is needed if the user can identify the content provider from available information (e.g. a program title, channel identifier, or the like).

As shown at 212, the home content brokerage agent determines the mobile user's current geographic or other location from home subscriber database 124. Also, as shown at 213, based on content provider identification data (and/or display identification data) and the location of user 101/terminal 132, the home content brokerage agent 114 identifies an appropriate mirror content brokerage agent (114A in this example) suitable for serving terminal 132. As shown at 214, home content brokerage agent 114 informs the mirror content brokerage agent 114A regarding the current extraction request. For example, 214 may represent transfer of session data to agent 114A. As shown at 215, the home content brokerage agent also updates user 101 profile with service authorization for the mirror agent 114A. At 216, home content brokerage agent 114 returns a webpage or other suitable interface data which allows user 101 to launch the content extraction service. In some embodiments, agent 114 may hand off the entire session to agent 114A, making agent 114A responsible for generating the launch webpage.

As shown at 217, the mobile user sends a request to launch the component extraction service to the suitable content brokerage agent. In this example, the launch request is sent to mirror content brokerage agent 114A, although if the home agent 114 was handling this particular session, the request would be sent to the home agent. Mirror content brokerage agent 114 obtains multimedia component streams corresponding to those shown on display 102 by establishing SIP/SDP/RTP multimedia sessions with content service provider 118 as shown at 218. Next, as shown at 219, mirror content brokerage agent 114A provides terminal 132 with data so that terminal 132 can render an interface, such as a mobile terminal webpage, comprising thumbnail image representations of the multimedia component streams. The thumbnail images may be static in some embodiments, or may be updated at a reduced frame rate.

Although in the example above the content brokerage agent provided thumbnail representations of the content streams, in other embodiments, content service provider 118 may dynamically generate thumbnail representations of its partial content streams and send the representations to content brokerage agents, such as part of or along with the XML or other files identifying the content streams.

As shown at 220, user 101 provides input to terminal 132 and terminal 132 sends selection data to content brokerage agent 114A, such as via a HTTP request. In response, as shown at 221, mirror content brokerage agent 114A provides the selected multimedia component streams by establishing one or more SIP/SDP/RTP multimedia sessions with terminal 132. Mirror content brokerage agent 114A then terminates the unused SIP/SDP/RTP session with content service provider 118 as shown at 222. User 101 can then view the requested stream(s) at terminal 132 until the end of the stream(s) or until another termination event occurs.

Several examples discussed above depict content provisioning in the context of a communication system configured in accordance with IMS standards and principles. One of skill in the art will appreciate that the present subject matter does not rely on IMS and is not limited to IMS-compliant systems.

For example, requests for content, responses to requests, and the content itself could be provided via other network types, such as broadband internet. Correspondingly, call routing, session requests, and the like need not be IMS-compliant.

Subscriber databases and information may be maintained by a wireless service provider in any suitable fashion, and not only using the HSS server.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A multimedia content brokerage computing device comprising:
  memory; and
  circuitry associated with the memory, the circuitry configured to:
    receive a request from a mobile device to launch an extraction service when the mobile device comes into vicinity of a device capable of receiving multimedia content component streams;
    determine a location of the mobile device;
    assign a server to provide content to the mobile device based on the location of the mobile device;
    establish a connection with a content provider;
    obtain the multimedia content component streams from the content provider;
    extract a plurality of identifiers for the multimedia content component streams; and
    provide the plurality of identifiers to the mobile device in a single instance, wherein a single user interface is generated at the mobile device using the plurality of identifiers where the plurality of identifiers includes an identifier that corresponds to each multimedia content component stream of the multimedia content component streams such that the single user interface includes each of the identifiers that corresponds to each multimedia content component stream.

2. The device set forth in claim 1 wherein the multimedia content brokerage computing device is further configured to:
  receive selection data from the mobile device identifying one multimedia content component stream of the multimedia content component streams for extraction; and
  provide content associated with the selection data to the mobile device.

3. The device set forth in claim 1, wherein the multimedia content brokerage computing device is further configured to buffer at least one of the multimedia content component streams and to discontinue buffering accessed data comprising at least one stream that is not identified in the selection data.

4. The device set forth in claim 1, wherein the multimedia content brokerage computing device is further configured to:
  interface with the content provider and, in response to the selection data provided by the mobile device, transmit data identifying at least one change in the device capable of receiving multimedia content component streams.

5. The device set forth in claim 1, wherein the multimedia content brokerage computing device is further configured to:
  determine whether one or more subscriptions are needed to obtain the multimedia component streams and, if so, obtain the needed subscription or subscriptions.

6. The device set forth in claim 1, wherein the multimedia content brokerage computing device is further configured to:
  after establishing a connection with the content provider, interface with the content provider and obtain at least one structured data file identifying a network address for each of the multimedia content component streams.

7. The device set forth in claim 1, wherein the multimedia content brokerage computing device is further configured to:
   obtain a structured data file comprising data identifying a spatial arrangement of a media presentation displayed on the device capable of receiving multimedia content component streams; and
   generate the user interface based on the structured data file.

8. The device set forth in claim 1, wherein the multimedia content brokerage computing device is further configured to:
   access presentation identification data and identify at least one content provider as part of a partial content service session; and
   based on the location of the mobile device and an identity of the content provider, determine whether to transfer the partial content service session to a mirror brokerage computing device.

9. The device set forth in claim 8 wherein the mirror brokerage computing device is configured to access the selection data, access data for the multimedia content component streams, buffer the data, and transmit the buffered data to the mobile device in response to a transfer of the partial content extraction session.

10. A method of providing partial content extraction, the method comprising:
    receiving a request from a mobile device to launch an extraction service when the mobile device comes into vicinity of a device capable of receiving multimedia content component streams;
    determining a location of the mobile device;
    assigning a server to provide content to the mobile device based on the location of the mobile device;
    establishing a connection with a content provider;
    obtaining multimedia content component streams from the content provider;
    extracting a plurality of identifiers for the multimedia content component streams; and
    providing the plurality of identifiers to the mobile device in a single instance, wherein a single user interface is generated at the mobile device using the plurality of identifiers where the plurality of identifiers includes an identifier that corresponds to each multimedia content component stream of the multimedia content component streams such that the single user interface includes each of the identifiers that corresponds to each multimedia content component stream.

11. The method set forth in claim 10, further comprising:
    receiving selection data from the mobile device identifying one multimedia content component stream of the multimedia content component streams for extraction; and
    providing content associated with the selection data to the mobile device.

12. The method set forth in claim 10, further comprising buffering at least one of the multimedia content component streams and, after receiving the selection data, discontinuing buffering at least one stream that is not identified in the selection data.

13. The method set forth in claim 10, further comprising:
    interfacing with the content provider and, in response to the selection data provided by the mobile device, transmitting data identifying at least one change in the device capable of receiving multimedia content component streams.

14. The method set forth in claim 10, wherein the user interface data defines a layout of a graphical user interface, the graphical user interface comprising respective portions corresponding to the one multimedia content component stream.

15. The method set forth in claim 10, further comprising:
    determining whether one or more subscriptions are needed to obtain the multimedia component streams and, if so, obtaining the needed subscription or subscriptions.

16. The method set forth in claim 10, further comprising:
    after establishing a connection with the content provider, interfacing with the content provider and obtaining at least one structured data file identifying a network address for each of the multimedia component content streams.

17. The method set forth in claim 16, further comprising:
    obtaining a structured data file comprising data identifying a spatial arrangement of a media presentation displayed on the device capable of receiving multimedia content component streams; and
    generating the user selection interface based on the structured data file.

18. The method set forth in claim 16, further comprising:
    accessing access presentation identification data;
    identifying at least one content provider for a partial content service session; and
    based on the location of the mobile device and an identity of the content provider, determining whether to transfer the partial content service session to a mirror brokerage computing device.

19. A multimedia content brokerage computing device comprising:
    memory; and
    circuitry associated with the memory, the circuitry configured to:
      receive a request from a mobile device to launch an extraction service when the mobile device comes into vicinity of a device capable of providing multimedia content component streams;
      determine a location of the mobile device;
      assign a server to provide content to the mobile device based on the location of the mobile device;
      establish a connection with a content provider;
      obtain the multimedia content component streams from the content provider;
      extract a plurality of identifiers for the multimedia content component streams;
      provide the plurality of identifiers to the mobile device in a web page wherein a single user interface is generated at the mobile device using the plurality of identifiers where the plurality of identifiers includes an identifier that corresponds to each multimedia content component stream of the multimedia content component streams such that the single user interface includes each of the identifiers that corresponds to each multimedia content component stream.

20. The device set forth in claim 19, wherein the circuitry is further configured to:
    receive selection data from the mobile device identifying one multimedia content component stream of the multimedia content component streams for extraction; and
    provide content associated with the selection data to the mobile device.

* * * * *